Figure 1:
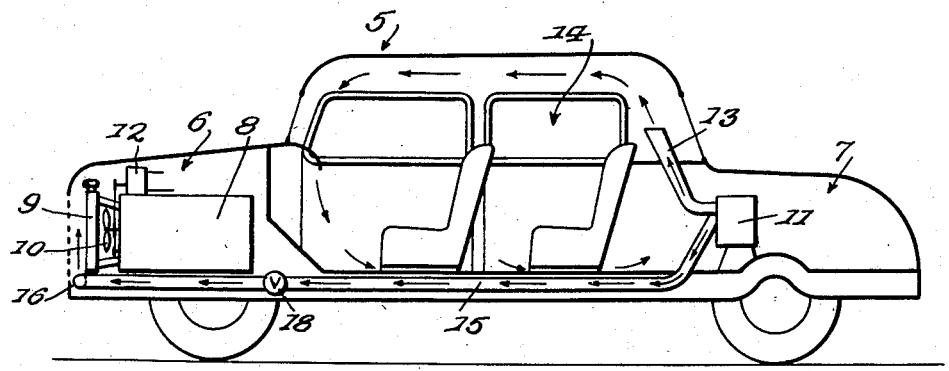

Jan. 13, 1959  G. P. BULLARD  2,867,996
COOLING MEANS FOR VEHICLE MOTORS
Filed Sept. 1, 1955

INVENTOR
G. P. Bullard
BY Bryant & Lowry
ATTORNEYS

United States Patent Office 2,867,996
Patented Jan. 13, 1959

2,867,996
COOLING MEANS FOR VEHICLE MOTORS
George P. Bullard, Pottstown, Pa.
Application September 1, 1955, Serial No. 531,877
2 Claims. (Cl. 62—243)

This invention relates to a novel way of preventing vehicle motors from attaining undesirably high temperatures, and it relates more specifically to a novel association of elements whereby an air conditioner, used to cool the interior of a vehicle body, acts also to materially cool the radiator of the vehicle motor cooling system.

When driving motor vehicles in hot weather under adverse conditions such as heavy city traffic necessitating frequent stops and motor idling, and slowly climbing steep hills in relatively low gear, serious overheating often occurs. On vehicles equipped with air conditioning units, the compressor of the air conditioner is frequently driven by the vehicle motor and this additional load plus the lower idling speed at abnormally high motor temperatures, often causes the motor to stall. The same result frequently occurs if the motor is left running while the car is parked, to keep the air conditioner in operation.

Such occurrences are prevented by the present invention which utilizes some of the air cooled by the air conditioner to cool the radiator and thus keep the motor at a normal operating temperature.

It is a further object of the invention to provide an arrangement which may be readily applied to the conventional motor vehicle structure, which does not involve change or rearrangement of standard parts, and which is economical and practical.

With the above and other objects in view that will become apparent as the nature of the invention is better understood, the same consists in the novel form, combination and arrangement of parts hereinafter more fully described, shown in the accompanying drawings, and particularly pointed out in the appended claims.

Figure 2:
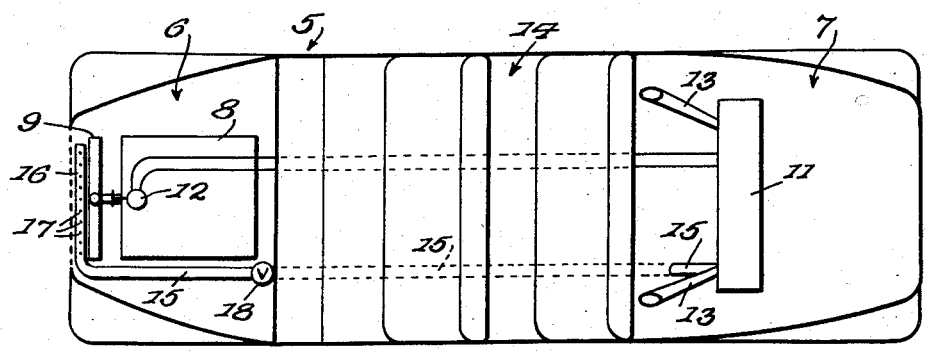

In the drawing:

Fig. 1 is a diagrammatic longitudinal section of an automobile equipped with an air conditioner and the present invention; and Fig. 2 is a diagrammatic horizontal sectional view.

An automobile 5 is shown having a motor compartment 6 at its front end and a luggage compartment 7 at its rear end. The vehicle motor is denoted at 8, its radiator at 9 and the usual fan at 10.

An air conditioner 11 is mounted in the luggage compartment 7 and its compressor 12 is shown mounted on and driven by the motor 8. Ducts 13 are shown for conducting cooled air from the air conditioner 11 to the interior 14 of the car body.

According to the present invention, some of the cooled air is conducted from the air conditioner 11 and utilized to cool the radiator 9. For this purpose, a cooled-air duct 15 has been shown extending forwardly from the air conditioner 11, said duct 15 having means 16 adjacent the radiator 9 for so discharging the cooled air as to cool said radiator. The means 16 is shown in the form of a lateral bend at the front end of the duct 15, said bend being disposed horizontally in front of and close to the lower end of the radiator 9. This bend 16 is provided with cooled-air discharge means shown in the form of perforations 17. Through these perforations, streams of the cooled air, supplied to the duct 15 by the air conditioner 11, are discharged, and these streams mingle and form a cool air blanket in front of the radiator 9. The cooled air is drawn through the radiator by the usual fan 10 and thus the cooling efficiency of said radiator is increased to prevent unusually high motor temperature even at idling speed.

A valve 18 is shown in the duct 15 for controlling the amount of cooled air passing therethrough. This valve may of course be manually, pneumatically or electrically operable and conveniently controlled within easy range of the operator.

As described, the discharge end of the duct 15 is illustrated in the form of a horizontal conduit or pipe positioned forwardly of the radiator 9 and at the lower end thereof with perforations 17 directed upwardly for the blowing of refrigerated air forwardly of the radiator 9 to be drawn through the radiator grille by the medium of the fan 10 of the usual motor cooling system. It is understood that this discharge end 16 of the refrigerated air conduit 15 may assume any shape or configuration desired, just so it is positioned forwardly of the radiator 9 and may extend upwardly in front of the radiator in the form of a circular conduit or crossed tube with perforations therein for the discharge of the refrigerated air toward the radiator.

From the foregoing, it will be seen that novel and effective provision has been disclosed for preventing motor stalling due to overheating and for preventing other troubles and inconveniences incident thereto. It is to be understood, however, that the present disclosure is illustrative only and that wide latitude exists in adapting the invention to various passenger cars, trucks and buses, whether the motor and radiator be at the front or at the rear.

I claim:

1. An air conditioning and motor cooling system for attachment to a conventional motor vehicle having an engine, a fan driven by said engine, and an engine cooling radiator at its front end, and a luggage compartment at its rear end; including a compressor adjacent said engine and driven thereby, an air conditioning unit in said luggage compartment operatively connected with said compressor, ducts for conducting cooled air to the passenger compartment of said vehicle, an elongated cooled air duct extending forwardly from said air conditioning unit along the body of said motor vehicle, discharge means at the end of said elongated duct furnishing cooled air to the front face of said radiator and means including said engine driven fan for drawing air through the radiator, said fan being disposed on the opposite side of the radiator from said discharge means.

2. An air conditioning and motor cooling system for attachment to a conventional motor vehicle having an engine, a fan driven by said engine, and an engine cooling radiator at its front end, and a luggage compartment at its rear end; including a compressor adjacent said engine and driven thereby, an air conditioning unit in said luggage compartment operatively connected with said compressor, ducts for conducting cooled air to the passenger compartment of said vehicle, an elongated cooled air duct extending forwardly from said air conditioning unit along the body of said motor vehicle, valve means in said duct for selectively cutting off the passage of air through said duct, discharge means at the end of said elongated duct furnishing cooled air to the front face of said radiator and means including said engine driven fan for drawing air through the radiator, said fan being disposed on the opposite side of the radiator from said discharge means.

References Cited in the file of this patent

UNITED STATES PATENTS

| | | |
|---|---|---|
| 1,111,526 | Coppock | Sept. 22, 1914 |
| 1,701,999 | Gardner | Feb. 12, 1929 |
| 1,826,471 | James | Oct. 6, 1931 |
| 2,264,848 | Kahl | Dec. 2, 1941 |
| 2,319,002 | Kramer | May 11, 1943 |
| 2,344,864 | Griswold | Mar. 21, 1944 |
| 2,514,253 | Partin | July 4, 1950 |